United States Patent [19]
Olcott

[11] 3,897,582
[45] July 29, 1975

[54] BRAKING ELEMENTS

[75] Inventor: Eugene L. Olcott, Falls Church, Va.

[73] Assignee: Atlantic Research Corporation, Alexandria, Va.

[22] Filed: Jan. 26, 1973

[21] Appl. No.: 327,971

Related U.S. Application Data

[63] Continuation-in-part of Ser. No. 65,899, Aug. 21, 1970, Pat. No. 3,738,906.

[52] U.S. Cl. ............ 428/114; 188/251 R; 428/222; 428/294; 428/331; 428/404; 428/408
[51] Int. Cl.² .......................................... B32B 5/12
[58] Field of Search ............ 161/168, 169, 60, 206, 161/162; 117/106 C, 161 A, DIG. 11, 46 CG; 188/251 A, 251 R, 218 R, 218 XL

[56] References Cited
UNITED STATES PATENTS

| | | | |
|---|---|---|---|
| 3,007,805 | 11/1961 | Cline | 106/44 |
| 3,379,555 | 4/1968 | Hough | 117/106 C |
| 3,391,016 | 7/1968 | McCrary et al. | 117/106 C |
| 3,464,843 | 9/1969 | Basche | 117/106 C |
| 3,552,533 | 1/1971 | Nitz et al. | 188/251 A |
| 3,629,049 | 12/1971 | Olcott | 117/46 CG |
| 3,639,197 | 2/1972 | Spain | 188/251 A |
| 3,653,851 | 4/1972 | Gruber | 117/106 C |
| 3,676,293 | 7/1972 | Gruber | 161/206 |
| 3,677,795 | 7/1972 | Bokros et al. | 117/46 CG |
| 3,685,059 | 8/1972 | Bokros et al. | 117/46 CG |
| 3,707,006 | 12/1972 | Bokros | 117/46 CG |
| 3,713,865 | 1/1973 | Leeds | 117/46 CG |
| 3,730,320 | 5/1973 | Freeder et al. | 188/251 A |
| 3,738,906 | 6/1973 | Olcott | 161/57 |

*Primary Examiner*—George F. Lesmes
*Assistant Examiner*—William R. Dixon, Jr.
*Attorney, Agent, or Firm*—Martha L. Ross

[57] ABSTRACT

Frictional braking elements comprising:

1. a pyrolytic graphite microcomposite comprising pyrolytic graphite crystallites containing embedded therein codeposited crystals of refractory carbide selected from the group consisting of silicon, zirconium, hafnium, titanium, tantalum, and niobium, and mixtures thereof. SiC, ZrC, and HfC are preferred. Particularly preferred are microcomposites comprising pyrolytic graphite crystallites containing embedded therein codeposited aciculae of crystalline silicon carbide, the longitudinal axes of the aciculae being aligned in the c-direction relative to the a-b plane of the associated pyrolytic graphite crystallite; and 2. a matrix comprising the pyrolytic graphite microcomposite of (1) containing embedded therein at least one reinforcing refractory strand layer comprising a plurality of unidirectional, substantially parallel, laterally-spaced, individual, continuous refractory strands. The microcomposite matrix is nucleated from each of the individual refractory strands and interconnected to form a continuous matrix phase surrounding and interconnecting the individual strands comprising the embedded strand layer.

50 Claims, 13 Drawing Figures

BRAKING ELEMENTS

CROSS REFERENCES TO RELATED APPLICATIONS

This application is a continuation-in-part of application Ser. No. 65,899 filed Aug. 21, 1970 now U.S. 3,738,906.

BACKGROUND OF THE INVENTION

Conventional braking devices generally operate by bringing a rotating member into frictional engagement with a stationary member with resulting conversion of kinetic into thermal energy. To operate effectively, the friction-bearing elements of the devices must be capable of absorbing the heat produced to prevent the development of excessively high temperatures at the frictional interface and related thermal stresses. In other words, they must function as effective heat sinks. They must also be resistant to oxidation at high temperatures to minimize erosion. High frictional resistance is also essential.

The art has recognized the advantages of frictional braking elements, such as brake discs, made of carbon. In the more advanced production techniques, the carbon materials are made by molding a mixture of carbon fibers and an organic polymer, pyrolyzing the polymer binder, reimpregnating with polymer to fill the many voids produced by pyrolysis, and repyrolyzing. The advantages of such carbon materials, as compared with metals, include their high temperature resistance, which makes possible higher frictional loadings on the interfaces, and their low density, which substantially reduces dead load problems, particularly for vehicles such as aircraft.

Although the pyrolyzed or graphitized carbon materials aforedescribed are superior to materials in which the carbonaceous binder has not been so treated, as for example, in terms of high temperature resistance and oxidation properties, they do pose certain limitations on performance. They have a relatively large number of voids or pores which substantially reduce the density. This, in turn, reduces the heat sink capability of a frictional braking element of a given size. To meet specific requirements, the frictional braking element, such as a brake disc, must either be made thicker with concurrent increase in the size of cooperating elements of the braking device, or must operate at higher frictional interface temperatures, with concomitant increase in oxidation and thermal stress. The aforedescribed carbon material is particularly prone to oxidation erosion at high temperatures, possibly because of the presence of numerous reaction sites.

The frictional braking elements of this invention provide substantially improved heat sink, friction, and oxidation-resistance properties of importance in a frictional braking element and, therefore, provide important improvements in the art.

The superior high temperature and chemical erosion resistant properties of pyrolytic graphite are well known. It does, however, have certain disadvantageous properties stemming from its particular crystallite structure which makes it unsuitable for use in the manufacture of frictional braking elements.

Pyrolytic graphite is normally produced by the pyrolysis of a carbonaceous gas, such as methane or propane, onto a heated substrate. Flat, hexagonal crystallites oriented generally parallel to the substrate surface are deposited in layers which build up into an essentially laminar structure. The pyrolytic graphite crystal is considerably wider in its flat or $a$-$b$ plane than along its thickness dimension or $c$-axis. The crystal structure is characterized by principal grains of a cone-like shape which are built-up from the flat crystallites. As described in "Pyrolytic Graphite Eengineering Handbook" prepared by Specialty Alloys Section, Metallurgical Products Dept., General Electric Company; Detroit, Mich.; July 15, 1963, the primary grain structure or cone is the largest identifiable unit of the structure in which a continuous variation exists in average orientation of basal planes of the crystallites and which is bound by discontinuous variations or cone boundaries. The cones usually follow a geometry approximated by a stack of spherical zones. Each spherical zone can be considered as containing a large number of crystallites. Each crystallite has its own $c$-axis which is oriented at 90° to its flat $a$-$b$ plane and points toward the origin of the cone. Because the spherical cones are actually a curved rather than a flat plane, the $c$-axis of each crystallite is inclined somewhat from that of adjacent crystallites. Considering the cone in its entirety, the angle of inclination of $c$-axes may vary widely between the cone boundaries. The angle for crystallites adjacent to opposite cone boundaries may differ by as high as 80° to 90° or more. Pyrolytic graphite cones tend to nucleate from discontinuities in the substrate. Laminar deposit layers are formed within each cone. These deposit layers represent the $a$-$b$ layer orientation of the crystallites.

As a result of its laminar structure, pyrolytic graphite is highly anisotropic in many of its properties, including strength, thermal conductivity, and thermal expansion with attendant difficulties in practical use. Because of its weakness in the $c$-direction, pyrolytic graphite tends to delaminate under high stresses. Its thermal conductivity in the $c$-direction is also a small fraction of its conductivity in the $a$-$b$ direction. Additionally, although pyrolytic graphite is the form of carbon which is most resistant to oxidation, it does have a tendency to oxidation, particularly at high temperatures in an oxidizing atmosphere.

The embedding within the pyrolytic graphite crystallite structure of codeposited crystals of refractory carbide, selected from the group consisting of silicon, zirconium, hafnium, titanium, and niobium, preferably, SiC, ZrC, and HfC, substantially reduces in the microcomposite the anisotropic effect of the pyrolytic graphite matrix and its tendency to delaminate by interrupting the laminar layers in the $a$-$b$ plane, thereby substantially eliminating many of the impediments to its practical use as a structural element. Strength and thermal conductivity in the thickness or $c$-direction are substantially increased and thermal expansion is reduced. Additionally the embedded refractory carbides substantially increase oxidation resistance since, unlike carbon which oxidizes to a gas, the refractory carbides oxidize to solid or liquid oxides which form a protective coating.

It has additionally been found that the embedded refractory carbides provide improved heat sink capabilities and frictional resistance properties which make them particularly advantageous for use in making frictional braking elements.

In copending U.S. application Ser. No. 65,899, filed Aug. 21, 1970, of which the present application is a continuation-in-part, there are disclosed novel, rigid, microcomposites of pyrolytic graphite containing embedded therein codeposited crystalline aciculae of SiC. The longitudinal axes of the crystalline aciculae are aligned in the c-direction, namely perpendicular to the a-b plane of the associated pyrolytic graphite crystallites at the point of embedment. Such microcomposites are particularly preferred materials for making the frictional braking elements of this invention.

Application Ser. No. 65,899 additionally discloses composite materials comprising a microcomposite matrix of the pyrolytic graphite-acicular SiC aforedescribed containing embedded therein at least one reinforcing refractory strand layer comprising a plurality of unidirectional and substantially parallel, laterally spaced, individual, continuous refractory strands. The microcomposite matrix is nucleated from each of the individual refractory strands and interconnected to form a continuous matrix phase. By conforming the microcomposite pyrolytic graphite crystallite layers containing the embedded, codeposited crystalline aciculae of SiC to embedded strand surfaces instead of to the surface of a conventional base substrate, anisotropy and delamination tendencies are further reduced and oxidation resistance improved. It has additionally been found that the embedded strands can increase heat sink capability of the frictional braking element.

Applications Ser. No. 592,846 (now U.S. Pat. No. 3,629,049) and 870,948 now U.S. Pat. No. 3,715,253, copending with application Ser. No. 65,899, disclose pyrolytic graphite articles comprising a matrix of pyrolytic graphite containing embedded continuous carbon strand layers which reduce the anisotropy of the pyrolytic graphite. They do not, however, disclose the improved heat sink, oxidation-resistant, or frictional properties of the materials employed in this invention or the frictional braking elements made therefrom.

SUMMARY OF THE INVENTION

Broadly, the invention relates to frictional braking elements, such as brake discs, brake shoes, and the like comprising a rigid pyrolytic graphite microcomposite comprising a pyrolytic graphite crystallite structure containing embedded therein codeposited crystals of refractory carbide selected from the group consisting of silicon, zirconium, hafnium, titanium, and tantalum, niobium. SiC, ZrC, and HfC are preferred. Particularly preferred are microcomposites comprising a pyrolytic graphite crystallite structure containing embedded therein codeposited aciculae of crystalline SiC, the longitudinal axes of the aciculae being aligned in the c-direction relative to the a-b plane of the associated pyrolytic graphite crystallite at the point of embedment.

The codeposition of the crystals of the specified refractory carbides so that they are embedded in and interrupt the laminar layers of pyrolytic graphite crystallite reduces anisotropy and the tendency of the layers to delaminate. The codeposition of crystalline aciculae of SiC as aforedescribed provides a very substantial dimension in the thickness or c-direction which is particularly effective in reducing anisotropy and delaminating tendency. This results in substantially increased strength in the thickness dimension and improvement in other properties, such as thermal expansion and thermal conductivity. Since SiC and the other refractory carbides are considerably harder than pyrolytic graphite, their presence in the microcomposites also improves erosion resistance. They also improve oxidation resistance since they are more resistant than graphite to oxidation and in addition produce refractory oxides which form a protective coating on the microcomposite.

The invention additionally comprises frictional braking elements formed from the aforedescribed pyrolytic graphite-refractory carbide microcomposites containing embedded therein at least one and preferably a plurality of reinforcing refractory strand layers, each strand layer comprising a plurality of unidirectional, substantially parallel, laterally-spaced, individual, continuous refractory strands. The microcomposite matrix is nucleated from each of the individual refractory strands and interconnected to form a continuous matrix phase surrounding and interconnecting the embedded strand layer or layers.

Nucleation and growth of the pyrolytic graphite-refractory carbide microcomposite from the contoured surfaces of the plurality of refractory strands further reduce and interrupt the laminar character of the pyrolytic graphite and thereby further reduce anisotropy and delamination tendency. The embedded continuous strands also act as strength reinforcements and provide a means for producing a composite having desired controlled and reliably reproducible characteristics.

The strands can be made of any suitable refractory material, such as carbon; refractory metals and metal alloys, carbides, borides, nitrides, and oxides. The continuous refractory strand can be in the form of an individual strand or a plurality of spaced, substantially unidirectionally-oriented, individual strands which can be simultaneously positioned as a strand layer, or a woven material such as a cloth or tape. The term "refractory strand" as employed herein includes an individual filament or a multiplicity of fibers which have been spun or otherwise incorporated to form the continuous strand.

The aforedescribed materials have been found to be particularly advantageous for use in making frictional braking elements because of their superior heat sink, oxidation resistance, and frictional resistance properties. The improved heat sink and oxidation-resistance properties reduce frictional interface temperatures and erosion of the elements.

The term "frictional braking element" as employed herein encompasses elements, such as brake discs, made entirely of the aforedescribed microcomposite materials and liners providing the friction-bearing face of the element, such as frictional liners on a brake shoe.

DETAILED DESCRIPTION OF THE INVENTION

The codeposited refractory carbide, as aforementioned, can be silicon, zirconium, hafnium, tantalum, titanium or niobium carbides, preferably silicon, zirconium, or hafnium carbide. Of these silicon carbide in the form of crystalline aciculae is particularly preferred.

The amount of codeposited refractory carbide should be at least 5%, preferably at least about 10%, by volume of the microcomposite. Depending upon the desired properties for a particular application, the percent can be as high as 90 or even 95. In general, the preferred range is about 10 to 50 volume percent, with the pyrolytic graphite making up the remainder.

In some applications, it may be desirable to use a microcomposite of graded relative pyrolytic graphite and refractory carbide composition. For example, the outermost portion of the microcomposite can have a higher refractory carbide content to minimize oxidative surface erosion. Such graded variations in the relative amounts of the codeposited pyrolytic graphite and refractory carbide can readily be achieved by varying respective flow rates of pyrolysis vapors or gases and/or other processing variables in the codeposition process.

Figure 1:
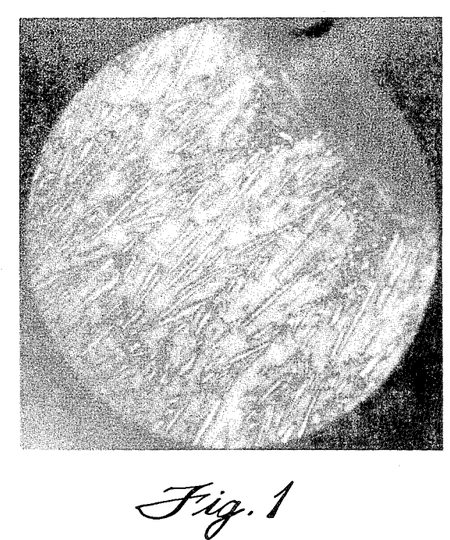
FIG. 1 is a photomicrograph at a magnification of 150 of a cross-section of the pyrolytic graphite-SiC microcomposite employed in making frictional braking elements of the invention.
Figure 2:
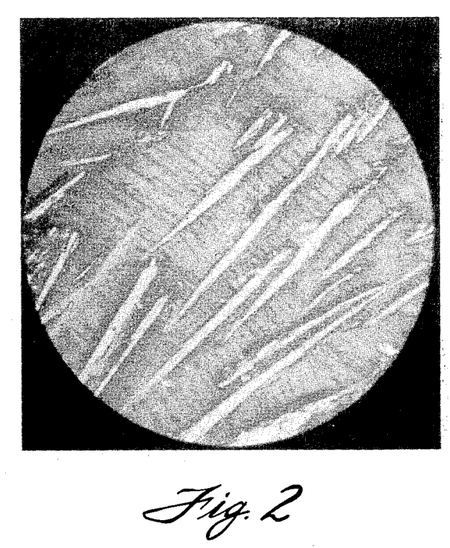
FIG. 2 is a photomicrograph of the same section at a magnification of 600.

The photomicrographs of FIGS. 1 and 2 at 150X and 600X magnification respectively, clearly show the SiC, a large proportion of which is in the form of needle-like aciculae oriented perpendicularly to the *a-b* plane of the associated crystallites forming the codeposited laminar layers of pyrolytic graphite, which forms an embedding matrix. The volume percent of SiC in the photographed sample is about 20%. The length to width ratio of the aciculae is generally at least about 2:1 and preferably is at least about 4:1.

The other refractory carbides, such as zirconium carbide and hafnium carbide, generally codeposit in the form of small crystals dispersed among the pyrolytic graphite crystallites. Although not as effective in these respects as the *c*-direction oriented acicular crystals of SiC, they substantially reduce anisotropy of the pyrolytic graphite and its tendency to delaminate.

It has been discovered that the aforedescribed microcomposites are particularly advantageous for use as frictional braking elements because of their superior heat sink capacities, oxidation and erosion resistance at elevated temperatures, and high frictional coefficients.

The codeposited refractory carbides substantially increase the heat sink capacity of the pyrolytic graphite matrix on a volume basis. The heat sink capacity, which is essentially the heat capacity per unit volume, is determined by the density and specific heat of the material. The heat sink capacity of SiC is about 43% higher than that of pyrolytic graphite and ZrC and HfC are about 36% higher. Increasing concentrations of the refractory carbides in the microcomposites increase effective heat sink capacity. The improved heat sink properties of the microcomposite reduce frictional interface temperatures and resulting thermal stresses, thereby reducing fracturing and erosion of the carbon braking element. They can also make possible some reduction in certain of the size dimensions of the braking device as a whole with advantageous reduction in the dead weight of cooperating metal components of the brake.

Inclusion of the codeposited refractory carbides in the microcomposites increases oxidation resistance since they are, in general, more resistant per se to oxidation and because, when oxidized, they produce refractory oxides as compared with carbon which oxidizes to a gas. The oxides form protective coatings on the frictional braking elements, thereby minimizing oxidative erosion. Frictional erosion is also reduced because the embedded codeposited crystals of refractory carbide are generally harder than the graphite.

The coefficient of friction of the microcomposites is considerably higher than that which the art considers to be an acceptable minimum for carbon disc brake materials. For example, the dynamic friction coefficient of a pyrolytic graphite —SiC microcomposite containing 20 vol. % SiC has a measured value of 0.56 (dry) as compared with a desired minimum of 0.2.

The microcomposites can be made by vapor phase pyrolysis of a mixture of a hydrocarbon gas and an appropriate gaseous metal compound, such as metal halide, onto a heated substrate at a temperature of about 2,800°–4,000°F. The acicular SiC microcomposite can be made by vapor phase pyrolysis of a mixture of methyl trichlorosilane and hydrocarbon at a temperature preferably of about 3200°–3800°F. An inert diluent gas, such as argon, nitrogen, helium, hydrogen, and mixtures thereof, is generally desirable. Mixtures of hydrogen with argon, helium, or nitrogen have been found particularly effective in obtaining good acicular crystalline SiC formation. The process can be carried out in a conventional furnace with related metering and injection equipment at reduced or atmospheric pressures.

The relative flow rates of the methyl trichlorosilane or metal halide, such as zirconium chloride or hafnium chloride, and hydrocarbon gas vary with the desired microcomposite composition. In general, the silane or metal halide may be introduced at a weight percent flow rate of about 5 to 75%, preferably about 15 to 50% and the hydrocarbon gas at a weight percent flow rate of about 25 to 95%, preferably about 15 to 50%.

The hydrocarbon gas can be any of those generally employed in producing pyrolytic graphite by vapor phase deposition, such as the lower alkanes, e.g., methane, ethane, and propane; ethylene; acetylene; and mixtures thereof. Methane is preferred.

EXAMPLE I

A cylindrical graphite substrate was seated in a 4 inch Perenny resistance furnace and heated to 3400°F. A mixture of methyl trichlorosilane, methane, argon and hydrogen were injected into one end of the graphite cylinder. The methyl trichlorosilane was entrained for injection by bubbling argon through a container of the liquid methyl trichlorosilane. Flow rates were: argon - 13 std. cu. ft/hr; hydrogen - 10 std. cu. ft/hr; methane 2.0 std. cu. ft/hr.

Total methyl trichlorosilane consumed was 85 gm.

Pyrolytic deposition was continued for 1 hour.

The thickness of the formed microcomposite and the relative amounts of the codeposited pyrolytic graphite and silicon carbide varied with distance from the injection nozzle. The thickest portion of the microcomposite formed was 26 mils and contained about 25 volume percent of needle-like crystalline aciculae of silicon carbide embedded in laminar layers of pyrolytic graphite. The volume percent of silicon carbide decreased with increasing distance from the injector. The photomicrographs of FIGS. 1 and 2 were made with a sample taken from a downstream portion having a silicon carbide volume percent of about 20.

The rigid microcomposite cylinder formed by the above procedure was sound and showed no signs of delamination after cooling.

EXAMPLE II

A run was made under conditions substantially the same as in Example I except that the pyrolysis temperature was maintained at 3600°F.

Results were substantially similar except that at the point of maximum deposition, the relative volumes of the SiC aciculae and the pyrolytic graphite were 15% and 85% and the SiC aciculae concentration then decreased with increasing distance from the injector.

The rigid microcomposite cylinder was sound and showed no signs of delamination after cooling.

EXAMPLE III

A pyrolytic graphite-SiC microcomposite was deposited on a one-inch diameter disc in a manner similar to the procedure used in the preceding examples except that no hydrogen was used and a 1inch disc substrate was centered at right angles to the injector so that a substantially uniform microcomposite was formed over the face of the disc.

To determine oxidation resistance, the resulting pyrolytic graphite-SiC microcomposite disc and a disc of the same size and substrate coated with an equal thickness of pyrolytic graphite were heated to about 3000°F in a highly oxidizing oxyacetylene flame for three minutes. The pyrolytic graphite coating was fully penetrated and almost completely burned away whereas the pyrolytic graphite-SiC coating eroded only on the surface with almost half of the thickness remaining intact.

Figure 3:
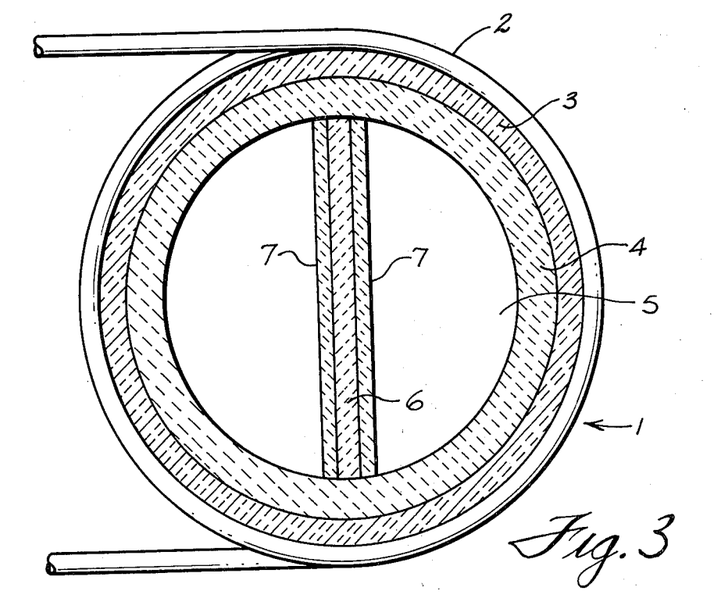
FIG. 3 is a schematic illustration in cross-section of apparatus for making microcomposite frictional braking elements.

FIG. 3 illustrates a first step in the manufacture of frictional brake discs. Furnace 1 is a conventional pyrolysis furnace provided with induction coil heating means 2, insulation 3, and graphite susceptor 4. Seated within furnace chamber 5 is mandrel substrate 6 in the form of a circular graphite disc. In order to prevent oxidation of the carbonaceous pyrolysis gases, atmospheric oxygen is removed and continuously excluded from the chamber by evacuation and/or purging with inert gases, such as helium or nitrogen, by conventional means not shown. The mandrel is heated to and maintained at the requisite pyrolysis temperature. The pyrolysis gases, such as a mixture of methane, vaporized methyltrichlorosilane, and an inert diluent gas, are injected into the chamber by conventional injector means, not shown, in a direction parallel to the faces of the disc mandrel. Pyrolysis of the gases results in deposition on each of the two faces of the mandrel of microcomposite discs 7 comprising a codeposite of pyrolytic graphite crystallites and refractory carbide as aforedescribed. Deposition is continued to build-up the codeposit to the thickness desired for the particular frictional brake disc.

After removal from the mandrel each of the two microcomposite disc blanks can be machined to produce a frictional rotor disc designed to be splined to and rotated by the wheel of the vehicle, such as aircraft, in conventional fashion or a frictional stator disc designed to be splined to the stationary sleeve of a torque tube. In conventional practice, the rotor and stator frictional braking discs are interleaved. To produce rotor disc 8, shown in fragmentary view in FIG. 4, a series of slots 9 are machined in the outer periphery of the blank to provide the desired key-slot arrangement. The center of the blank is cut to provide annulus 10. Stator disc 11, shown in FIG. 5, can be produced by machining a series of appropriately spaced slots 12 in the inner periphery of the disc after machining of annulus 10 to provide the desired key-slot arrangement.

Figure 6:
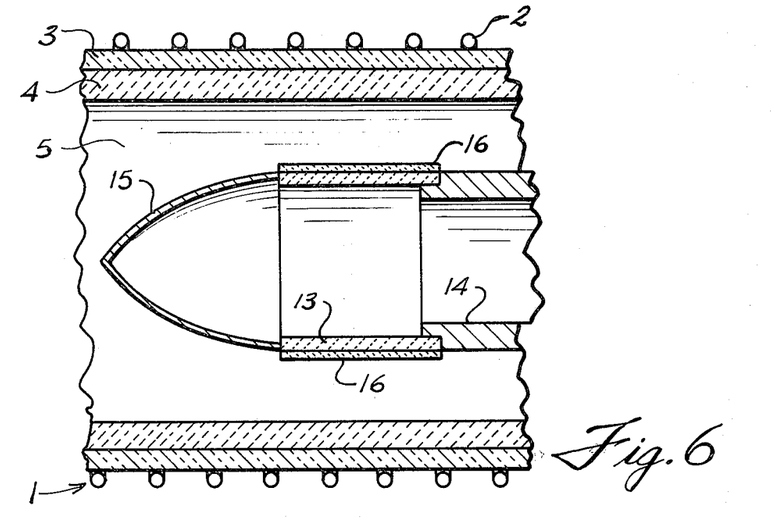
FIG. 6 is a schematic illustration in longitudinal section of modified apparatus for making microcomposite frictional braking elements.

FIG. 6 shows a modified mandrel arrangement for the production of annular microcomposite blanks which can be employed for the manufacture of brake shoe liners or annular brake discs. Annular graphite substrate mandrel 13 is positioned in furnace chamber 5 on support 14. Gas flow guide 15 is positioned upstream of the annular mandrel to guide the incoming stream of pyrolysis gases onto the outer periphery of the heated mandrel. Pyrolysis results in the formation of annular microcomposite blank 16. Codeposition of the graphite and carbide crystals continues until the blank is of the desired thickness.

Figure 4:
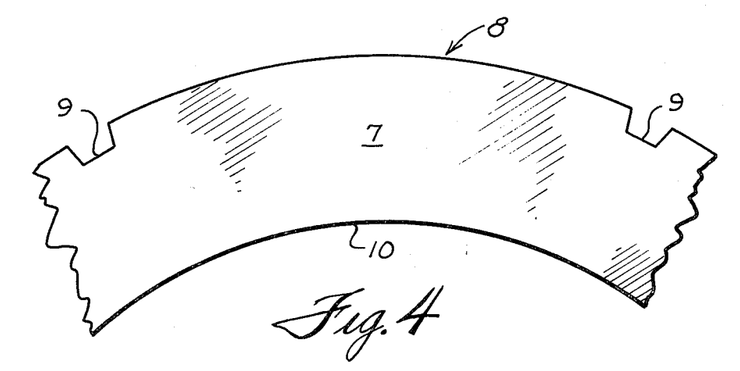
FIG. 4 is a fragmentary plan view of a rotor brake disc.
Figure 5:
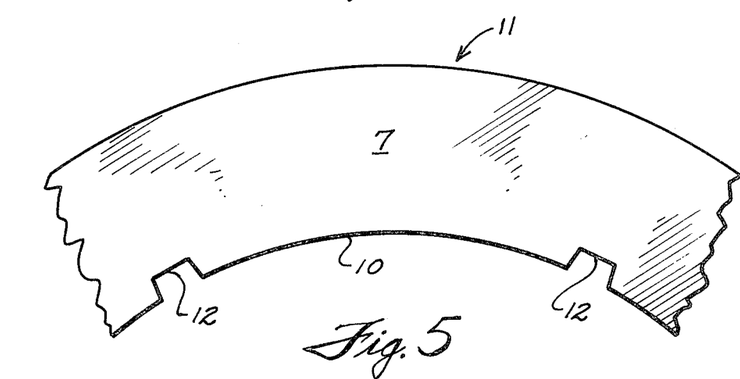
FIG. 5 is a fragmentary plan view of a stator brake disc.
Figure 7:
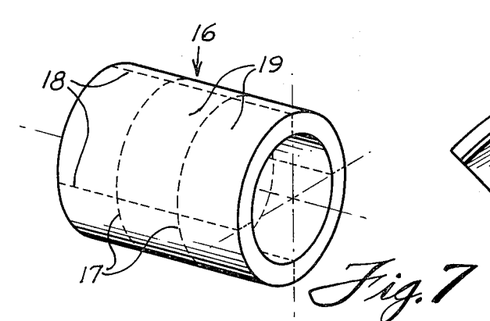
FIG. 7 illustrates the configuration of the microcomposite blank formed in the apparatus of FIG. 6 and its mode of use in making brake shoe liners.
Figure 8:
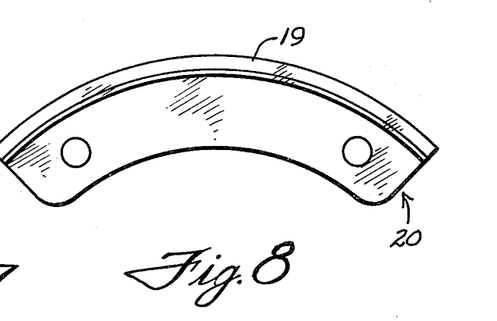
FIG. 8 is a schematic representation of a brake shoe and frictional liner of the invention.

Blank 16, produced in the desired radial annulus and web thickness dimensions, can be used for the fabrication of frictional braking elements, such as brake shoe liners. As shown in FIG. 7 by dotted lines 17, the blank can be sliced normal to its axis in the desired width dimensions of the brake shoe liner. The blank can additionally be cut longitudinally along dotted lines 18 to produce curved frictional brake shoe liner elements 19 of the desired length. FIG. 8 shows liner 19 in position on the face of conventional brake shoe 20. Blank 16 can also be used for the manufacture of brake discs by cutting it as shown by dotted lines 17 and machining the resulting annular discs to produce the slotkey configurations as shown in FIGS. 4 and 5.

The pyrolytic graphite-refractory carbide microcomposites can be reinforced to increase strength and further reduce anisotropy of the pyrolytic graphite component by embedding at least one layer of a plurality of unidirectional and substantially parallel, laterally-spaced, individual, continuous, refractory strands in the microcomposite by nucleating the codeposited pyrolytic graphite and refractory carbide from each of the strands to form a continuous interconnecting matrix surrounding and interconnecting the individual strands.

The refractory strand can be single or multifilament and can be made from a refractory material such as carbon in any suitable form, including, for example, pyrolized rayon and pyrolytic graphite; refractory metals, such as boron, tungsten, and molybdenum, and alloys thereof; refractory carbide, such as silicon, boron, tantalum, zirconium, hafnium, titanium, and niobium carbide, and mixtures thereof; refractory borides, such as zirconium, hafnium, titanium, and tantalum boride, and mixtures thereof; refractory nitrides, such as silicon and boron nitride and mixtures thereof; refractory oxides, such as aluminum, silicon, zirconium, and hafnium oxides, and mixtures thereof; refractory-coated refractory metal filaments, such as SiC— or boron-coated tungsten; and the like. Although carbon, because of its relatively low cost and general availability, is a preferred strand material, other refractory materials, above listed, are advantageous for use in the frictional braking elements of the invention because of their generally higher resistance to oxidation. Many of these refractory materials also have as high or higher strength to weight ratios as carbon and, therefore, can contribute greater actual strength to the composite. Silicon carbide, boron, and aluminum oxide are preferred species.

It has additionally been found that the improved heat sink capacity of the microcomposite can be further increased by careful selection of refractory strand materials, such as silicon carbide, having desirably high heat capacities on a volume basis. Oxidation resistance of the microcomposites can also be further increased by the use of embedded refractory strand materials, such as SiC, aluminum oxide, boron, tungsten, and the like, which have high oxidation resistant properties.

The strand-reinforced microcomposites can be made by progressively positioning a continuous, individual refractory strand onto a shaped form and simultaneously pyrolyzing the mixture of pyrolysis gases onto the strand at about the point of positioning contact to nucleate pyrolytic graphite and codeposited refractory carbide from the strand, progressively positioning additional strand laterally spaced from previously positioned strand and, as the additional strand is positioned, simultaneously pyrolyzing the gases thereon at about the point of positioning contact and on the codeposited pyrolytic graphite and refractory carbide nucleated from previously positioned strand.

Figures 9, 10, 11:
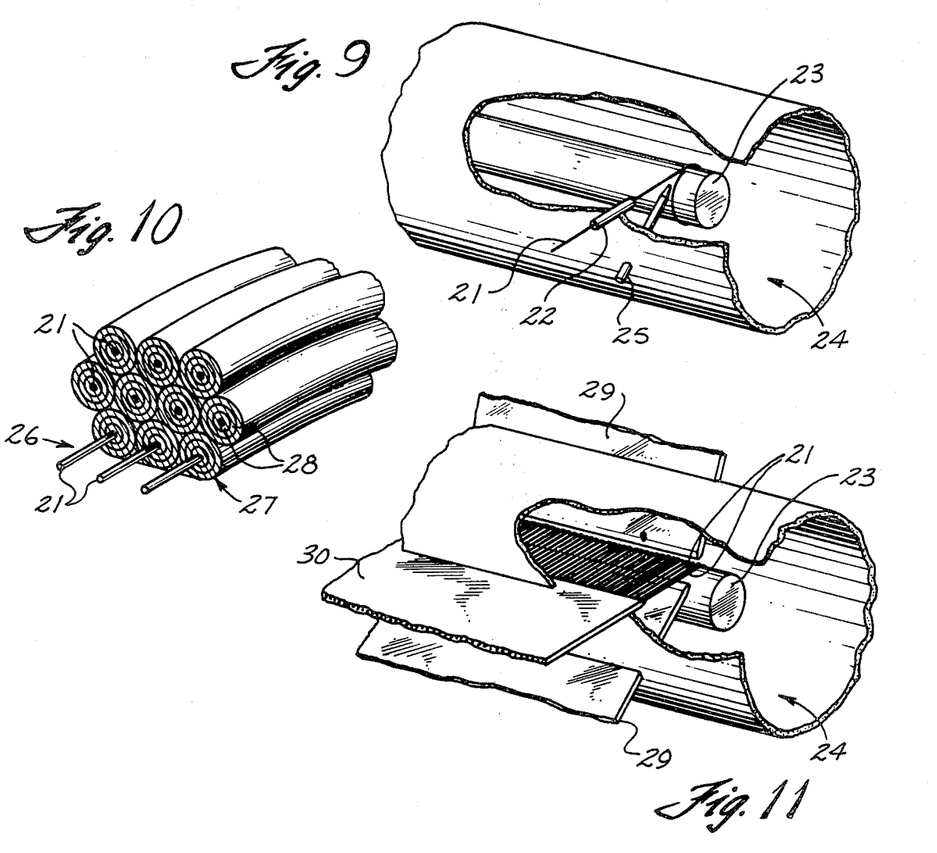
FIG. 9 is a schematic illustration of apparatus for manufacturing microcomposite frictional braking elements containing embedded continuous strand.
FIG. 10 is a schematic illustration of strand-reinforced microcomposite material employed in this invention.
FIG. 11 is a schematic representation of modified apparatus suitable for manufacturing strand-reinforced microcomposite frictional braking elements.

FIG. 9 illustrates a first step in the manufacture of strand-reinforced frictional braking elements of the invention. As shown therein, a continuous, individual refractory strand 21 is fed through guide tube 22 and progressively positioned onto cylindrical mandrel 23, disposed in furnace chamber 24. The diameter of the mandrel is desirably selected to be equal to the desired internal diameter of the frictional braking element, e.g., brake disc or brake shoe liner, being fabricated. The mandrel and strand are heated to and maintained at a temperature sufficient to pyrolyze the gases by induction, radiant, or resistance means not shown. The mandrel is rotated and moved longitudinally relative to the strand guide tube 22, by means not shown. In this manner, spaced turns of strand are progressively positioned on the mandrel. As the strand is wound, the mixture of pyrolysis gases is fed through tube 25 to impinge upon the strand at about the point of winding contact. Pyrolysis of the gas occurs and a pyrolytic graphite-refractory carbide microcomposite matrix is nucleated from the heated strand substrate. As winding continues, the microcomposite is simultaneously deposited on the strand being wound and on the matrix deposited on previously wound strands. Thus the strands are not only individually enveloped in a microcomposite matrix but are interconnected and bonded to each other by the matrix. The winding and codeposition is continued until the desired radial or thickness dimension of the frictional braking element has been achieved. The internal structure of the composite material is schematically illustrated in FIG. 10. As shown, the composite comprises a plurality of spaced, reinforcing strand layers 26, each of which comprises a plurality of spaced strands 21, disposed in and interconnected by microcomposite matrix 27, composed of graphite crystallite layers 28 containing embedded codeposited crystals of the refractory carbide, such as perpendicularly-oriented, codeposited aciculae of SiC.

As shown, the crystallite layers in the microcomposite matrix are oriented in conformity to surfaces of the strands and are, therefore, aligned around the strands and in the direction of strand orientation, thereby maximizing strength of the pyrolytic graphite component in that direction. Furthermore, the embedded strands significantly reinforce the microcomposite-strand composite in the direction of strand orientation.

Since the orientation of the pyrolytic graphite crystallite layers conforms to the strand surfaces rather than the base or mandrel substrate surface of the composite, the pyrolytic graphite component of the microcomposite does not have the continuous laminar structure characteristic of pyrolytic graphite. This, together with the embedded codeposited crystals of the refractory carbide, such as the perpendicularly-oriented SiC aciculae, further tends to prevent propagation of cracks and delaminations. Composite strength in the thickness direction is also further significantly improved by the increased degree of crystallite layer alignment in that direction. In addition, the marked disparity in thermal expansion and thermal conductivity in the $a$-$b$ and $c$ directions characteristic of conventional pyrolytic graphite is further reduced.

The strands also prevent delamination failure by restricting the thickness of laminar pyrolytic graphite growth units nucleated from the strands. It is known that growth units less than 0.05 inches thick are less subject to delamination. Since the thickness of the growth units is generally about one-half the distance between the strands, preferred unit size is obtained by spacing the strands less than 0.1 inch of each other.

The process for composite fabrication can be practiced with individual strands as shown in FIG. 9, or with multistrand structures, such as a plurality of laterally-spaced, unidirectionally-oriented, individual strands, or with woven cloths or tapes comprising strands oriented in both warp and woof directions. When using multistrand structures to prepare a composite, it is preferred simultaneously to impinge the reactive gas mixture on both sides of the strand structure as it is progressively laid down to ensure that the gas penetrates between the strands to effect the highest degree of lateral bonding. This can be accomplished by apparatus as shown in FIG. 11, wherein gas injector channels 29 feed gas into contact with spaced strands 21 fed through guide channel 30. In composites having multiple reinforcing strand layers, the direction of strand orientation can be varied in different reinforcing layers as shown, for example, in FIG. 12. Thus composites having desired directional strength characteristics can readily be prepared.

The invention can be practiced by positioning strand on a variety of shaped forms having the desired configuration. The strand can progressively positioned on the shaped form by any desired technique. Winding is preferred for reasons of simplicity. It will be understood that the term "progressively positioning" connotes a gradual laying down of strand to continuously and progressively increase the area of strand contact with the shape form rather than effecting overall lateral strand contact as by "stacking." This permits matrix formation between strands as they are positioned and eliminates the necessity of forcing the feed gas mixture between prepositioned strands.

Figure 13:
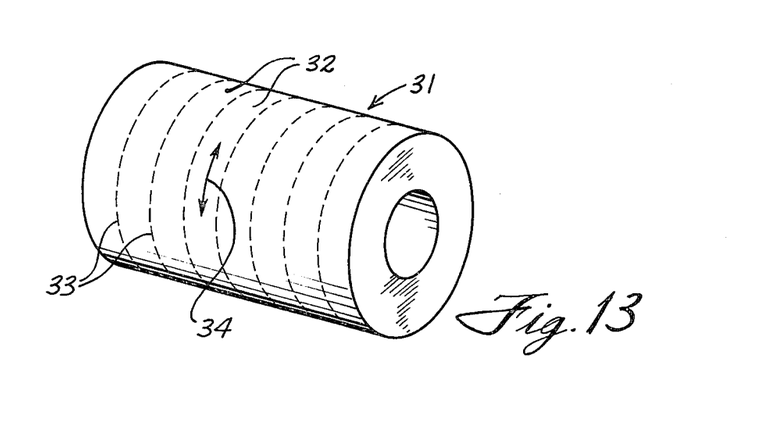
FIG. 13 illustrates the configuration of the blank formed in the apparatus of FIGS. 9 and 11 and its mode of use in making brake discs.

FIG. 13 shows schematically the embedded-strand, microcomposite blank fabricated in the furnace apparatus of FIGS. 9 and 11, which can be employed in making frictional braking elements. As illustrated, the cylindrical annular blank 31 can be employed to make a plurality of flat annular discs 32 by cutting it normal to its axis as shown by dotted lines 33. The direction of continuous embedded strand orientation is shown by double-pointed arrow 34. Each of the discs 32 can be machined to produce rotor or stator brake discs as illustrated in FIGS. 4 and 5. The blank can additionally be sliced longitudinally as illustrated in FIG. 7 to produce frictional brake shoe liners as illustrated in FIG. 8.

Figure 12:
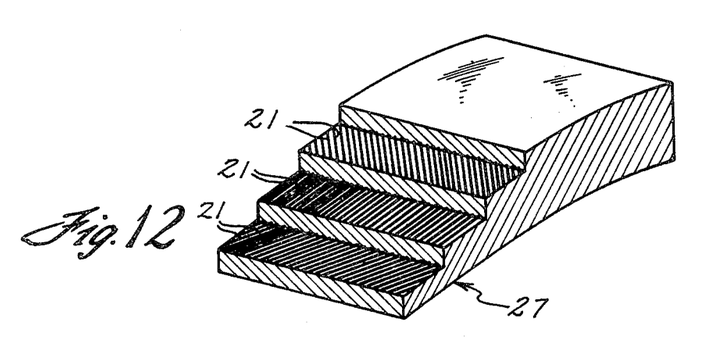
FIG. 12 schematically illustrates an alternative arrangement of reinforcing strand layers.

It will be understood that the direction of the layers of continuous strands can be varied each from the other as shown, for example, in FIG. 12 or in their general direction of orientation in the frictional braking elements, these variations being determined by the particular mode of fabrication and/or machining.

Although this invention has been described with reference to illustrative embodiments thereof, it will be apparent to those skilled in the art that the principles of this invention can be embodied in other forms but within the scope of the claims.

I claim:

1. A frictional braking element comprising a pyrolytic graphite microcomposite comprising pyrolytic graphite crystallite layers containing embedded therein, in an amount comprising about 5% to 95% by volume of said microcomposite, codeposited, dispersed crystals of a refractory carbide selected from the group consisting of silicon, zirconium, hafnium, titanium, tantalum, and niobium carbide, and mixtures thereof, said element comprising said microcomposite being shaped in the form of a frictional braking element.

2. The frictional braking element of claim 1 wherein the refractory carbide is selected from the group consisting of silicon carbide, zirconium carbide, hafnium carbide and mixtures thereof.

3. The frictional braking element of claim 2 wherein the refractory carbide is silicon carbide in the form of crystalline aciculae, the longitudinal axes of said aciculae being aligned in the $c$-direction relative to the $a$-$b$ plane of the associated pyrolytic graphite crystallites at the point of embedment.

4. The frictional braking element of claim 2 wherein the element is a brake disc.

5. The frictional braking element of claim 3 wherein the element is a brake disc.

6. The frictional braking element of claim 2 wherein the element is a brake shoe liner.

7. The frictional braking element of claim 3 wherein the element is a brake shoe liner.

8. The frictional braking element of claim 1 wherein said microcomposite is a matrix containing embedded therein at least one reinforcing strand layer, said strand layer comprising a plurality of unidirectional and substantially parallel, laterally-spaced, individual, continuous, refractory strands, said matrix being nucleated from each of said strands and interconnected to form a continuous matrix phase surrounding and interconnecting each of said individual strands comprising said embedded at least one strand layer.

9. The frictional braking element of claim 8 wherein the refractory carbide is selected from the group consisting of silicon carbide, zirconium carbide, hafnium carbide and mixtures thereof.

10. The frictional braking element of claim 9 wherein the refractory carbide is silicon carbide in the form of crystalline aciculae, the longitudinal axes of said aciculae being aligned in the $c$-direction relative to the $a$-$b$ plane of the associated pyrolytic graphite crystallites at the point of embedment.

11. The frictional braking element of claim 9 wherein said at least one reinforcing strand layer comprises a plurality of layers.

12. The frictional braking element of claim 10 wherein said at least one reinforcing strand layer comprises a plurality of layers.

13. The frictional braking element of claim 9 wherein the refractory strands are made of a material selected from the group consisting of carbon, metals and alloys thereof, carbides, borides, nitrides, and oxides, and mixtures thereof.

14. The frictional braking element of claim 10 wherein the refractory strands are made of a material selected from the group consisting of carbon, metals and alloys thereof, carbides, borides, nitrides, and oxides, and mixtures thereof.

15. The frictional braking element of claim 11 wherein the refractory strands are made of a material selected from the group consisting of carbon, metals and alloys thereof, carbides, borides, nitrides, and oxides, and mixtures thereof.

16. The frictional braking element of claim 12 wherein the refractory strands are made of a material selected from the group consisting of carbon, metals and alloys thereof, carbides, borides, nitrides, and oxides, and mixtures thereof.

17. The frictional braking element of claim 15 wherein the refractory strand is carbon.

18. The frictional braking element of claim 16 wherein the refractory strand is carbon.

19. The frictional braking element of claim 15 wherein the refractory strand is silicon carbide.

20. The frictional braking element of claim 16 wherein the refractory strand is silicon carbide.

21. The frictional braking element of claim 11 wherein the element is a brake disc.

22. The frictional braking element of claim 12 wherein the element is a brake disc.

23. The frictional braking element of claim 13 wherein the element is a brake disc.

24. The frictional braking element of claim 14 wherein the element is a brake disc.

25. The frictional braking element of claim 15 wherein the element is a brake disc.

26. The frictional braking element of claim 16 wherein the element is a brake disc.

27. The frictional braking element of claim 17 wherein the element is a brake disc.

28. The frictional braking element of claim 18 wherein the element is a brake disc.

29. The frictional braking element of claim 19 wherein the element is a brake disc.

30. The frictional braking element of claim 20 wherein the element is a brake disc.

31. The frictional braking element of claim 11 wherein the element is a brake shoe liner.

32. The frictional braking element of claim 12 wherein the element is a brake shoe liner.

33. The frictional braking element of claim 13 wherein the element is a brake show liner.

34. The frictional braking element of claim 14 wherein the element is a brake shoe liner.

35. The frictional braking element of claim 15 wherein the element is a brake shoe liner.

36. The frictional braking element of claim 16 wherein the element is a brake shoe liner.

37. The frictional braking element of claim 17 wherein the element is a brake shoe liner.

38. The frictional braking element of claim 18 wherein the element is a brake shoe liner.

39. The frictional braking element of claim 19 wherein the element is a brake shoe liner.

40. The frictional braking element of claim 20 wherein the element is a brake shoe liner.

41. The frictional braking element of claim 1 wherein the refractory carbide comprises about 10 to 50% by volume of said microcomposite.

42. The frictional braking element of claim 2 wherein the refractory carbide comprises about 10 to 50% by volume of said microcomposite.

43. The frictional braking element of claim 3 wherein the refractory carbide comprises about 10 to 50% by volume of said microcomposite.

44. The frictional braking element of claim 4 wherein the refractory carbide comprises about 10 to 50% by volume of said microcomposite.

45. The frictional braking element of claim 5 wherein the refractory carbide comprises about 10 to 50% by volume of said microcomposite.

46. The frictional braking element of claim 6 wherein the refractory carbide comprises about 10 to 50% by volume of said microcomposite.

47. The frictional braking element of claim 7 wherein the refractory carbide comprises about 10 to 50% by volume of said microcomposite.

48. The frictional braking element of claim 8 wherein the refractory carbide comprises about 10 to 50% by volume of said microcomposite.

49. The frictional braking element of claim 9 wherein the refractory carbide comprises about 10 to 50% by volume of said microcomposite.

50. The frictional braking element of claim 10 wherein the refractory carbide comprises about 10 to 50% by volume of said microcomposite.

* * * * *